J. WAGAR.
DRIVING CONNECTION FOR TRACTION WHEELS.
APPLICATION FILED APR. 28, 1913.

1,128,082.

Patented Feb. 9, 1915.

WITNESSES
M. R. McInnis
G. E. Sorensen

INVENTOR
JEROME WAGAR
BY Paul & Paul
ATTORNEYS

UNITED STATES PATENT OFFICE.

JEROME WAGAR, OF BANTRY, NORTH DAKOTA.

DRIVING CONNECTION FOR TRACTION-WHEELS.

1,128,082.

Specification of Letters Patent.

Patented Feb. 9, 1915.

Application filed April 28, 1913. Serial No. 764,146.

*To all whom it may concern:*

Be it known that I, JEROME WAGAR, citizen of the United States, and a resident of Bantry, McHenry county, North Dakota, have invented certain new and useful Improvements in Driving Connections for Traction-Wheels, of which the following is a specification.

The object of the invention is to provide an improved means for driving the wheels of a traction engine to the end that the strain will be applied through the spokes substantially to the middle portion of the wheel rim.

The invention consists generally in various constructions and combinations, all as hereinafter described and particularly pointed out in the claims.

Figure 1:
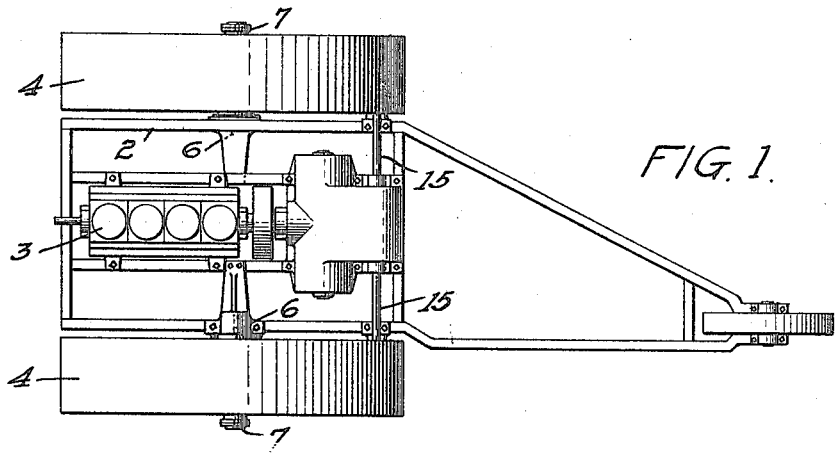
Figure 2:
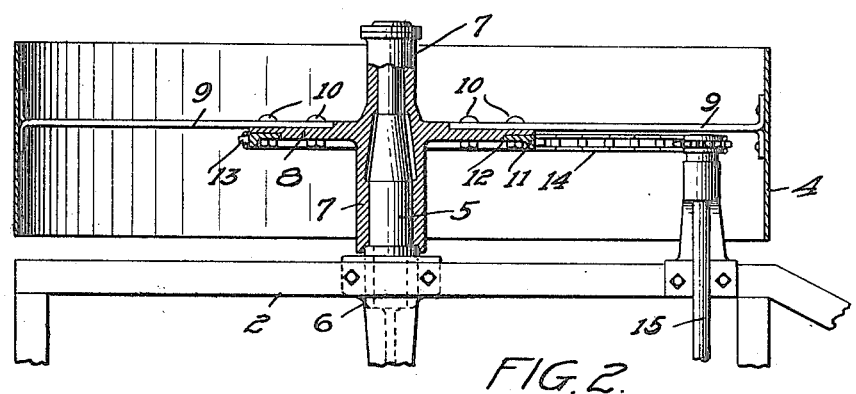
Figure 3:
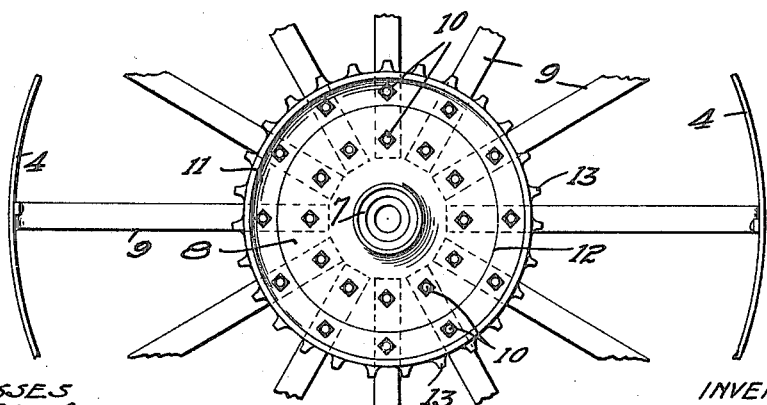

In the accompanying drawings forming part of this specification, Figure 1 is a plan view of a traction engine embodying my invention, Fig. 2 is a plan sectional view through one of the traction wheels, showing the means for applying the power thereto, Fig. 3 is a side view of the traction wheel, a portion of the rim being broken away.

In the drawing, 2 represents the frame of the machine and 3 a source of power mounted thereon.

4 represents the traction wheels and 5 is a spindle mounted on the frame at 6 and having a hub 7. This hub is preferably of cast metal, and has a radial flange 8 formed integrally therewith, projecting outwardly at right angles substantially to the hub and near its middle portion. A series of spokes 9 are secured at their outer ends to the middle portion of the traction wheel rim and their inner ends are secured by bolts 10 to the flange 8. There are preferably two bolts for each spoke, and the outer bolt, in addition to securing the spoke to the flange, also passes through a toothed ring 11 which fits within a recess 12 in the outer portion of the flange and has its teeth 13 projecting outwardly a sufficient distance to engage the links of a sprocket chain 14. This chain lies in the plane of the flange 8 within the circumference of the traction wheel, and is driven from a counter shaft 15, mounted on the forward portion of the engine frame and operatively connected with the engine shaft by a suitable means, not shown. Both wheels are equipped in the same manner and driven from the shaft projecting within the circle of the wheels and the power of the engine will be applied through the sprocket chains 14 to the wheels, integral with the hubs 7, and from thence transmitted through the spokes to the middle portions of the traction wheels, thereby applying the driving power centrally with respect to these wheels and insuring a uniform bearing of the hubs on the spindles and a uniform wear from end to end of the hubs. Frequently in machines of this type the power is applied at one side of the middle portion of the rims and will result in twisting or distorting the wheels, causing them to run unevenly and producing a greater wear on one portion of the hubs than on another portion. In my improved driving connection the strain will be evenly distributed and less power will be required to drive the machine.

I claim as my invention:—

1. A wheel comprising a hub, a sprocket wheel mounted on said hub, a rim encircling said sprocket wheel, the inner and outer edges of said rim being equi-distant substantially from said sprocket wheel, and a series of spokes secured to said sprocket wheel and to said rim.

2. A wheel comprising a hub having a flange projecting outwardly at right angles substantially thereto, a gear secured to said flange, a wheel rim, spokes secured to said flange and to the middle portion of said rim, whereby power applied to said flange will be transmitted through said spokes to the middle portion of said rim.

3. A wheel comprising a hub provided with a centrally arranged, integral flange projecting outwardly therefrom, a rim encircling said hub, a series of spokes bolted at one end to said flange and projecting outwardly therefrom and secured to the middle portion of said rim, a toothed ring mounted on said flange, the application of power to said toothed ring being transmitted through said spokes to the central portion of said rim.

4. A wheel comprising a hub, a gear mounted on said hub and lying in a plane intersecting the center of the tread surface of said wheel, whereby the propelling force will be applied uniformly to said wheel.

In witness whereof, I have hereunto set my hand this 23" day of April 1913.

JEROME WAGAR.

Witnesses:
J. EDGAR WAGAR,
H. M. WEYDAHL.

Copies of this patent may be obtained for five cents each, by addressing the "Commissioner of Patents, Washington, D. C."